United States Patent [19]

Kinoshita

[11] Patent Number: 4,938,015
[45] Date of Patent: Jul. 3, 1990

[54] REINFORCING STEEL CORDS

[75] Inventor: Mitsuru Kinoshita, Tochigi Pref., Japan

[73] Assignee: Bridgestone Bekaert Steel Cord Co., Ltd., Tokyo, Japan

[21] Appl. No.: 376,453

[22] Filed: Jul. 7, 1989

[30] Foreign Application Priority Data

Nov. 11, 1988 [JP] Japan .................. 63-283975

[51] Int. Cl.$^5$ .................. D02G 3/48; D02G 3/12; D02G 3/22
[52] U.S. Cl. ........................ 57/200; 57/248; 57/902; 152/527; 152/556
[58] Field of Search ............... 57/200, 212, 213, 243, 57/216, 248, 902; 152/451, 527, 556, 557

[56] References Cited

U.S. PATENT DOCUMENTS

| 3,090,189 | 5/1963 | Boussu et al. | 57/902 X |
| 4,258,543 | 3/1981 | Canevari et al. | 57/212 |
| 4,333,306 | 6/1982 | Yamashita et al. | 57/213 X |
| 4,385,486 | 5/1983 | Iwata et al. | 57/212 X |
| 4,718,470 | 1/1988 | Kusakabe et al. | 152/451 |
| 4,738,096 | 4/1988 | Hatakeyama et al. | 57/902 X |

FOREIGN PATENT DOCUMENTS 57-143297 9/1982 Japan .
61-108397 7/1986 Japan .

Primary Examiner—John Petrakes
Attorney, Agent, or Firm—Sughrue, Mion, Zinn, Macpeak & Seas

[57] ABSTRACT

A steel cord for the reinforcement of rubber products and the like has an open twisted structure comprised of 3 to 6 steel filaments each having an ellipsoidally helical shape, and has a particular tensile elongation under a load of 5 kg.

5 Claims, 3 Drawing Sheets

FIG_1a
FIG_1b
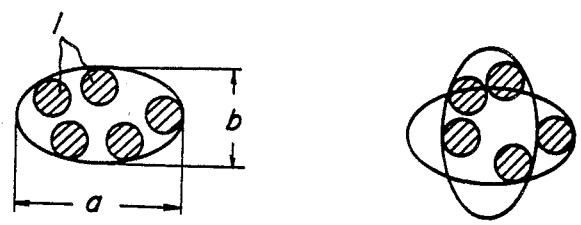
FIG_2
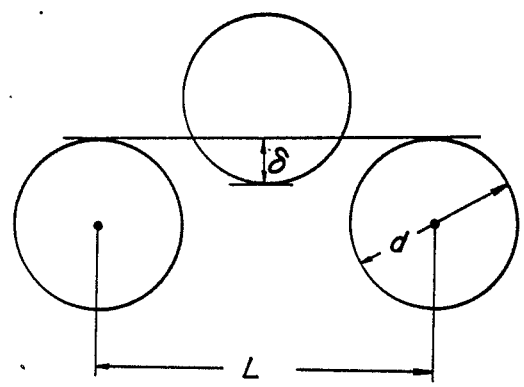

FIG_5
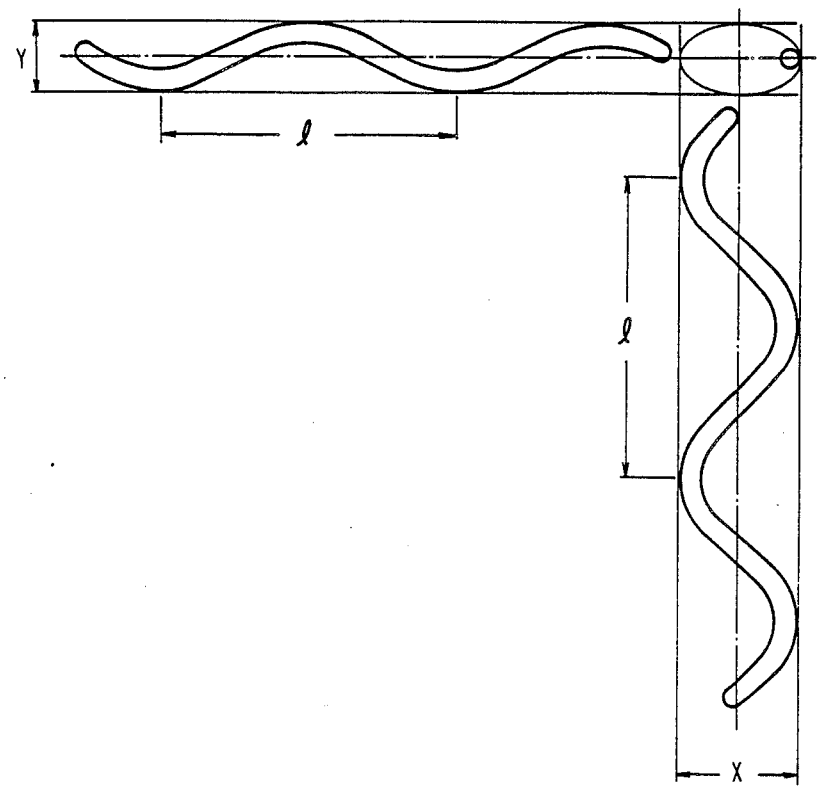
FIG_6a
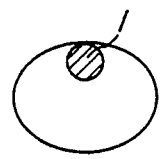
FIG_6b
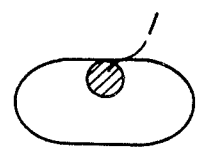

REINFORCING STEEL CORDS

BACKGROUND OF THE INVENTION

1. Field of the Invention

This invention relates to steel cords used as a reinforcement for rubber articles such as tire, industrial belts and the like as well as plastic products having a poor fluidity due to the mixing with fine powders such as carbon black, silica and so on, and more particularly to an improvement of steel cords having a so-called open twisted structure with the use of steel filaments.

2. Related Art Statement

In articles or products reinforced with steel cord, there is a problem that the durable life of the product is lowered due to the corrosion of steel filament under an influence of water penetrates into the product. For this end, it has been attempted to improve the corrosion resistance of the steel cord by subjecting the surface of the steel filament to a metallic plating, or by forming a so-called open twisted structure capable of penetrating rubber into the inside of the cord (Research Disclosure, June 1978, page 33).

In the steel cords using metallic plated steel filaments, when they are used under a condition that strain is repeatedly applied to the steel cord, the plated layer is abraded by fretting between mutual steel filaments in the cord to lose the corrosion resisting action. On the other hand, in the cord of the open twisted structure, the space between mutual steel filaments becomes narrower when a slight tension is only applied to the cord, and consequently the penetration of rubber or plastic into the inside of the cord becomes difficult.

In order to improve the rubber penetrability, Japanese Utility Model laid open No. 61-108397 discloses steel cords having such an open twisted structure such that steel filaments are substantially twisted in an ellipsoidally helical shape at the section of the cord. Since this cord is large in the tensile elongation under a load of 2 kg, however, the space between mutual steel filaments constituting the cord becomes narrower and the penetration of rubber or plastic into the inside of the cord is obstructed.

Furthermore, Japanese Patent laid open No. 62-170594 discloses the open twisted structure that the steel filaments are divided into at least two groups having different forming ratios and a maximum forming ratio is 1.65, minimum forming ratio is 1.05 and a difference therebetween is within a range of 0.20–0.40. In this case, however, the helical shape of steel filament is not optimized, so that the processability of the cord and the rubber penetrability are undesirably deteriorated and also the harmonization of steel filaments and the retention of strength in the cord are degraded.

SUMMARY OF THE INVENTION

It is, therefore, an object of the invention to provide a novel steel cord of open twisted structure having an improved penetrability of rubber or plastic into an inside of the cord.

According to the invention, there is the provision of a reinforcing steel cord having an open twisted structure obtained by twisting 3 to 6 steel filaments each having an ellipsoidally helical shape, said ellipsoid being represented by the following equation:

$$(x/a)^2 + (y/b)^2 = 1,$$

provided b/a: 0.70–0.90. and the card having a tensile elongation of 0.50–0.90% under a load of 5 kg/cord.

In this equation:
a is the major axis of the ellipse;
b is the minor axis of the ellipse;
x is the variable major axis of a helically formed filament, and
y is the variable minor axis of a helically formed filament.

In preferred embodiments of the invention, a ratio of tensile elongation under a load of 2 kg ($_2$) to tensile elongation under a load of 5 kg ($P_2$) is not more than 0.80, and at least one space among spaces between adjoining steel filaments is different from the other spaces.

Further, the steel cord according to the invention is manufactured at a twisting pitch of 6–30 mm, preferably 6–20 mm.

BRIEF DESCRIPTION OF THE DRAWINGS

The invention will be described with reference to the accompanying drawings, wherein:

FIGS. 1a and 1b are schematically sectional views of the steel cord according to the invention, respectively;

FIG. 2 is a diagrammatic view of straightening rolls;

FIG. 5 is a schematic view showing an ellipsoidally helical shape of steel filament; and FIGS. 6a and 6b are sectional views of the steel filament, respectively.

DESCRIPTION OF THE PREFERRED EMBODIMENTS

Figure 3:
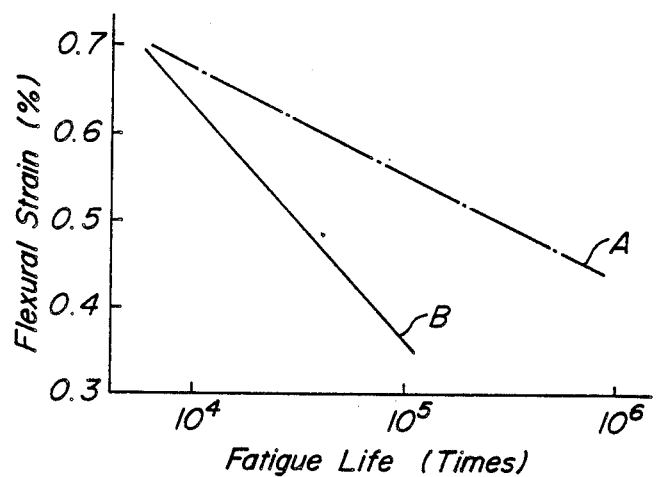
FIG. 3 is a graph showing a relation between cord structure and fatigue life.

As shown in FIGS. 1a and 1b, the steel cord according to the invention has a so-called open twisted structure that five steel filaments 1 are twisted in an ellipsoidally helical shape so as to separate away these filaments 1 from each other. When the phase of ellipsoidally helical shape is same in the filaments, the section of the cord is shown in FIG. 1a, while when the phase is shifted in the filaments, the section of the cord is shown in FIG. 1b.

The term "ellipsoidally helical shape" used herein means that the helically formed filament is arranged along the periphery of ellipsoid. In this case, the ellipsoid satisfies the equation of $(x/a)^2 + (y/b)^2 = 1$.

The steel cord according to the invention may be obtained by forming 3 to 6 steel filaments at a forming ratio of 105–140% into a helical shape, twisting them to form a cord of the open twisted structure, and then passing the cord through straightening rolls at a bending deflection ratio of not less than 12.5%.

The forming ratio is represented by an equation of $(d_f/d_c) \times 100(\%)$, wherein $d_f$ is a diameter of a cord obtained by twisting a given number of formed filaments and $d_c$ is a diameter of a cord obtained by densely twisting the same number of steel filaments without forming. Moreover, when the filament shows an ellipsoidally helical shape, $d_f = (a+b)/2$.

When using the straightening rolls as shown in FIG. 2, the bending deflection ratio is represented by an equation of $(\delta/L) \times 100(\%)$, wherein $\delta$ is a bending deflection quantity (mm) and L is a distance between centers of the rolls (mm).

The reason why the bending deflection ratio is limited to not less than 12.5% is due to the fact that when it is less than 12.5%, the winding form of the filament changes from ellipsoid into circle and the rubber penetrability is degraded. On the other hand, it has been found that when the distance between the centers of the rolls is not less than 2 times of a twisting pitch length in the cord, the position shifting of the ellipsoidally helical shape in the filaments is caused to improve the rubber penetrability.

When the operating conditions of the straightening rolls are set to the above, residual compression stress is given to the surface of the filament constituting the cord, whereby the resistance to corrosion fatigue in the filament can be improved.

The reason why the number of steel filaments is limited to a range of 3–6 is due to the following facts. That is, when the number of the filaments is 1 or 2, the strength per cord is too low at the same cord diameter, so that if it is intended to obtain the same cord strength, the filament diameter becomes too large and the fatigue resistance is lowered to such an extent that the resulting cord becomes unsuitable for practical use. Furthermore, the effect of improving the rubber penetrability by the ellipsoidally helical shaping of the filament is not achieved in case of using one or two filaments. On the other hand, when the number of the steel filaments is 7 or more, the cord diameter becomes too large and the thickness of the reinforcing layer using such cords becomes thicker, which becomes uneconomical and deteriorates the heat build-up. Moreover, it can be considered that the filament diameter is made small for obtaining the same cord diameter, but in this case the drawing work of the filament is undesirably degraded.

According to the invention, the steel filament is preferable to have a diameter of 0.15–0.40 mm, particularly 0.15–0.30 mm in order to economically produce the steel filament suitable for use in the formation of the cord according to the invention. Further, when such filaments are used to form a cord, the mechanical fatigue durability of the resulting cord is enough to be put into practical use.

The steel cord used for the reinforcement of rubber products or taken out from the product is comprised of steel filaments having an ellipsoidally helical shape. In this case, the ellipsoid is necessary to satisfy the equation of $(x/a)^2+(y/b)^2=1$, provided b/a: 0.70–0.90.

In this equation:
a is the major axis of the ellipse;
b is the minor axis of the ellipse;
x is the variable major axis of a helical formed filament, and
y is the variable minor axis of a helical formed filament. Thus, the tensile elongation under a load of 5 kg of the cord becomes small, and particularly the tensile elongation under a load of 2 kg/cord as an index showing the penetrability of rubber into the inside of the cord becomes small, so that the reduction of the space between mutual filaments is suppressed to largely improve the rubber penetrability. In other words, the tensile elongation under a load of 2 kg/cord can be reduced by using the ellipsoidally helical formed filaments according to the above equation, whereby the rubber penetrability can be improved.

In FIG. 3 are shown test results when cords A obtained by twisting ellipsoidally helical formed filaments and applying residual compression stress through straightening rolls, and cords B obtained only by twisting ellipsoidally helical formed filaments are subjected to a rotating flexural fatigue test at a temperature of 25° C. in an atmosphere having a relative humidity of 90%. As seen from FIG. 3, the fatigue life is improved by application of residual compression stress.

Figure 4:
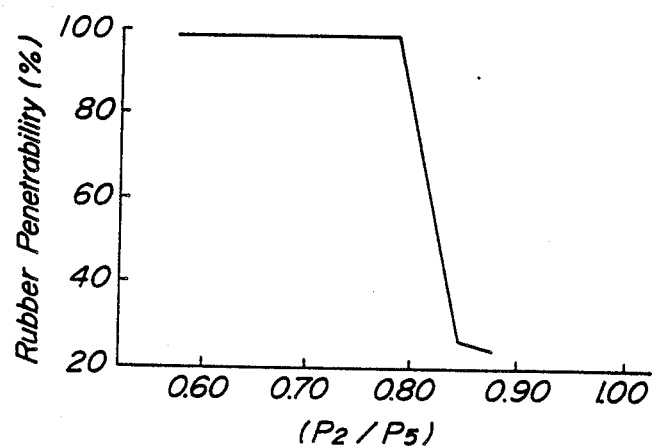
FIG. 4 is a graph showing a relation between tensile elongation and rubber penetrability.

In order to enhance the penetration of rubber between filaments, a ratio of tensile elongation under a load of 2 kg ($P_2$) to tensile elongation under a load of 5 kg ($P_5$) is preferable to be not more than 0.80 as shown in FIG. 4. The results of FIG. 4 are based on the following experiment. That is, steel cords of 1×5 twisting structure were embedded in a sheet of a curable natural rubber composition containing 50 parts by weight of carbon black and cured at a temperature of 145° C. under a pressure of 20 kgf/cm² for 30 minutes, and the cured sheet was cut at an interval of 5 mm in the longitudinal direction of the cord, and then 10 cut sections of the cord were observed by means of an optical microscope to measure the penetrating degree of rubber into the inside of the cord.

Moreover, the steel filaments are irregularly arranged to make at least one space between mutual filaments among spaces between the filaments different from the other spaces, whereby the elongation strain under a load of 2 kg can be made small to improve the rubber penetrability.

The following examples are given in illustration of the invention and are not intended as limitations thereof.

EXAMPLE 1

Five steel filaments of 0.23 mm in diameter were drawn and helically formed through a forming butt so as to have a diameter corresponding to 1.15 times of cord diameter having a compact cord structure. Then, the thus formed filaments were twisted together to form a cord of open twisted structure. Thereafter, the cord was passed through straightening rolls zigzag arranged as shown in FIG. 2, whereby the filament was changed from a circle into an ellipsoidally helical shape. In the zigzag arrangement of the rolls as shown in FIG. 2, the bending deflection quantity (δ) was 4.2 mm, and the diameter of the roll (d) was 14 mm, and the distance between centers of the rolls (L) was 20 mm, and the total number of rolls was 13. An example of the section of the thus obtained filament is schematically shown in FIG. 5. In such a filament, the filament had an ellipsoidally helical shape as shown in FIG. 6a, and the penetrating degree of rubber into the inside of the cord was approximately 100%.

On the other hand, when the bending deflection quantity (δ) was 6.8 mm and the distance between the centers of the rolls (L) was 24 mm as conditions through the straightening rolls, the shape of the filament was rendered into a flat ellipsoid including a straight line segment as shown in FIG. 6b, and the penetrating degree of rubber into the inside of the cord was 20%.

EXAMPLE 2

There were provided various steel cords of open twisted structure 1×5×0.23 mm) comprised of steel filaments according to conditions shown in the following Table 1, and then the rubber penetrability and resistance to corrosion fatigue were measured with respect to these steel cords to obtain results as shown in Table 1.

Moreover, the resistance to corrosion fatigue was represented by an index on the basis that the fatigue life in the cord of Run No. 1 was 100 after the test cord was subjected to a rotating flexural fatigue test at a temperature of 25° C. in an atmosphere having a relative humidity of 90% while applying a flexural strain of 0.5% to the bare cord. The larger the numerical value, the longer the fatigue life and hence the better the resistance to corrosion fatigue.

major axis in the ellipsoid was 0.83, $P_5$ was 0.55%, and $P_2/P_5$ was 0.75, and the rubber penetrability was 100%.

As mentioned above, in the steel cord according to the invention, not only the penetration of rubber or plastic into the inside of the cord but also the resistance to corrosion fatigue in the filament itself are improved, so that the invention particularly provides steel cords suitable for the reinforcement of belt or carcass in pneumatic radial tires for passenger cars or truck and bus.

TABLE 1

| Run No. | 1 | 2 | 3 | 4 | 5 | 6 | 7 | 8 |
|---|---|---|---|---|---|---|---|---|
| Shape of filament | circle | flat ellipsoid | ellipsoid | ellipsoid | ellipsoid | ellipsoid | ellipsoid | ellipsoid |
| Minor axis/major axis ratio in ellipse | 1.0 | 0.82 | 0.81 | 0.80 | 0.86 | 0.79 | 0.94 | 0.89 |
| Elongation under load of 5 kg $P_5$ (%) | 0.81 | 0.45 | 0.58 | 0.72 | 0.87 | 0.62 | 1.35 | 1.24 |
| $P_2/P_5$ | 0.82 | 0.74 | 0.69 | 0.70 | 0.71 | 0.68 | 0.63 | 0.70 |
| Rubber penetrability (%) | 30 | 45 | 100 | 100 | 100 | 100 | 60 | 60 |
| Resistance of corrosion fatigue (index) | 100 | 110 | 130 | 135 | 130 | 130 | 120 | 120 |
| Remarks | conventional example | comparative example | acceptable example | | | | comparative example | |

EXAMPLE 3

Since the forming shape of the filament, $P_5$, $P_2/P_5$ and ratio of minor axis to major axis in ellipsoid are different in accordance with the filament diameter, number of filaments and twisting machine used, the steel cord according to the invention is not determined only by the specification of the straightening rolls. In this example, the steel cord according to the invention was obtained by adjusting conditions for the straightening rolls used in the conventional technique as follows.

In case of the cord having a structure of $1 \times 3 \times 0.28$, when the diameter of the roll (d), the bending deflection quantity (δ) and the distance between the centers of the rolls (L) were 19 mm, 4.2 mm and 24 mm in the straightening rolls, respectively, the forming shape of the filament was ellipsoidal, and the ratio of minor axis to major axis in the ellipsoid was 0.81, $P_5$ was 0.58%, and $P_2/P_5$ was 0.69, and the rubber penetrability was 100%.

In case of the cord having a structure of $1 \times 4 \times 0.23$, when the diameter of the roll (d), the bending deflection quantity (δ) and the distance between the centers of the rolls (L) were 16 mm, 4.2 mm and 24 mm in the straightening rolls, respectively, the forming shape of the filament was ellipsoidal, and the ratio of minor axis to

What is claimed is:

1. A reinforcing steel cord having an open twisted structure obtained by twisting 3 to 6 steel filaments each having an ellipsoidally helical shape, said ellipsoid being represented by the following equation:

$$(x/a)^2 + (y/b)^2 = 1,$$

where:
a is the major axis of the ellipse,
b is the minor axis of the ellipse,
x is the variable major axis of a helically formed filament.
y is the variable minor axis of a helically formed filament provided b/a: 0.70–0.90, and said cord having a tensile elongation of 0.50–0.90% under a load of 5 kg/cord.

2. The steel cord according to claim 1, wherein a ratio of tensile elongation under a load of 2 kg to tensile elongation under a load of 5 kg is not more than 0.80.

3. The steel cord according to claim 1, wherein at least one space between adjoining steel filaments is different from other spaces between adjoining steel filaments.

4. The steel cord according to claim 1, wherein said filaments are twisted at a twisting pitch of 6–30 mm.

5. The steel cord according to claim 1, wherein said steel filament has a diameter of 0.15–0.40 mm.

* * * * *